United States Patent [19]

Kerr et al.

[11] 4,254,946

[45] Mar. 10, 1981

[54] LOWER UNIT REPAIR FIXTURE

[76] Inventors: Robert M. Kerr, P.O. Box 1135; George F. Crabtree, 174 Roper Dr., both of Winter Garden, Fla. 32787

[21] Appl. No.: 53,457

[22] Filed: Jun. 29, 1979

[51] Int. Cl.[3] .................... B23Q 3/00

[52] U.S. Cl. .................... 269/152; 269/285; 269/296; 269/76

[58] Field of Search .................... 269/76, 71, 296, 152, 269/100, 285

[56] References Cited

U.S. PATENT DOCUMENTS

| | | | |
|---|---|---|---|
| 1,344,559 | 6/1920 | Ohmacht | 269/71 |
| 1,481,503 | 1/1924 | Carswell et al. | 269/296 |
| 1,732,081 | 10/1929 | Clement | 269/71 |
| 2,913,241 | 11/1959 | Miner | 269/71 |
| 2,973,198 | 2/1961 | Marks | 269/71 |
| 3,290,040 | 12/1966 | Kerr | 269/296 |
| 3,317,205 | 5/1967 | Kerr | 269/296 |
| 4,108,425 | 8/1978 | Crabtree | 269/71 |

*Primary Examiner*—Robert C. Watson

*Attorney, Agent, or Firm*—Sughrue, Rothwell, Mion, Zinn and Macpeak

[57] ABSTRACT

A repair fixture for the lower unit of an outboard motor or outdrive which has a U-form body with a bight portion and side arms. One of the arms carries a tubular supporting projection which is telescopically mounted in a fixed sleeve on a work surface. The bight portion is notched centrally to engage the leading edge of a lower unit housing, and the side arms have clamps to releasably engage one of the horizontal cavitation fins of said unit.

4 Claims, 4 Drawing Figures

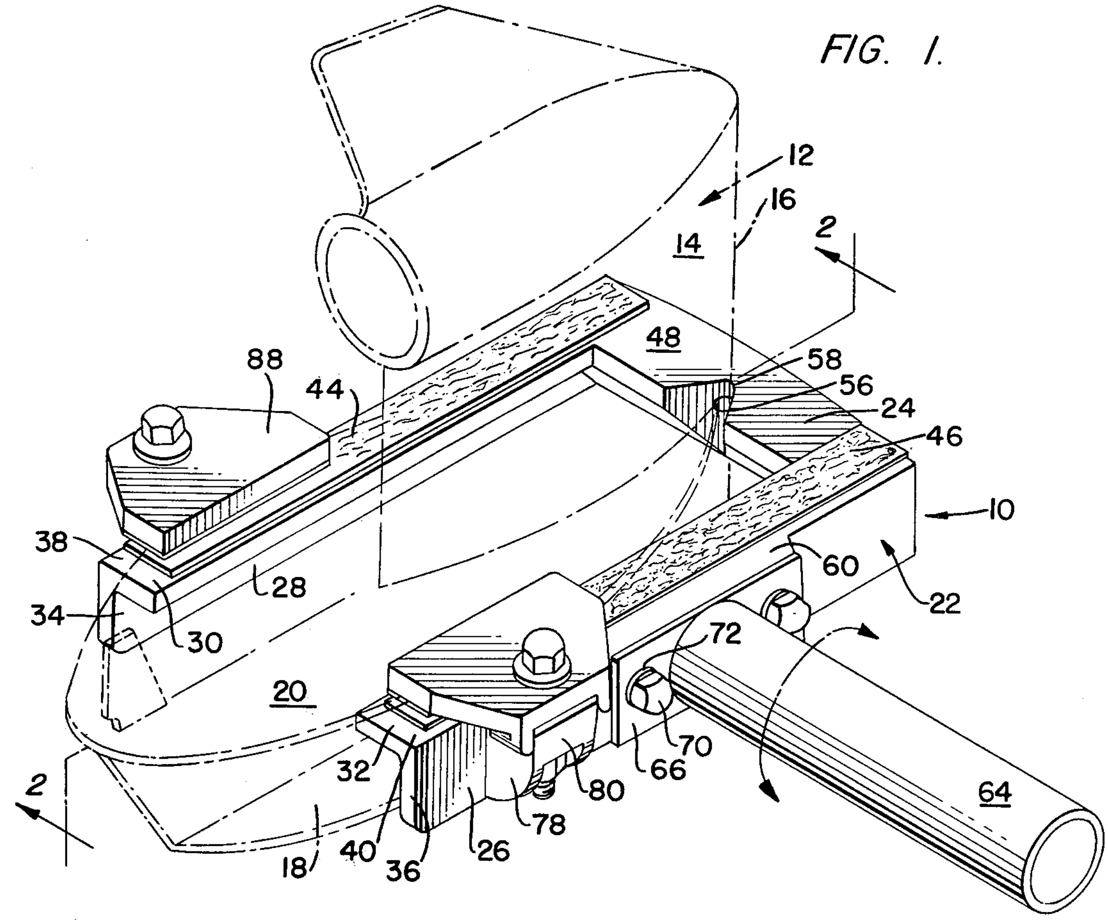
FIG. 1.
FIG. 2.
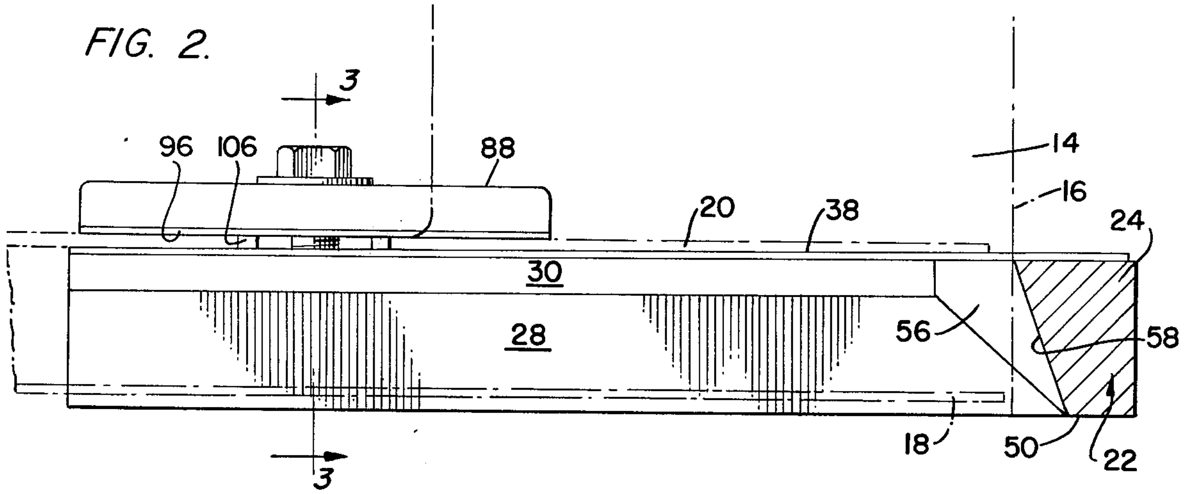

LOWER UNIT REPAIR FIXTURE

BACKGROUND OF THE INVENTION

1. Field of the Invention:

This invention pertains to clamping devices used in the servicing and/or repair of outboard motors or outdrive lower units.

2. Statement of the Prior Art:

This invention is an improvement in the subject matter of prior U.S. Pat. Nos. 3,317,205 and 3,290,040. Other patents in this general field include U.S. Pat. Nos. 3,590,664 and 3,982,740.

SUMMARY OF THE INVENTION

In recent years lower units employed in outboard motors and inboard/outboard outdrives have undergone substantial design modifications. These modifications have included the incorporation of double cavitation plates or flanges. Also, some units involve closed gear cases which renders it desirable that the unit be side-mounted, inasmuch as such mounting allows for vertical rather than horizontal alignment.

The fixture hereof is provided with a unique side mounting arrangement which is extremely stable and safe in operation, and which maximizes access to the work piece.

A further advantage of the holder resides in the incorporation therein of a V-notch for engagement of the leading edge of the unit in the tool. The notch ensures correct alignment of the unit relative to the tool.

Other and further objects and advantages of the invention will become apparent to those skilled in the art from a consideration of the following specification when read in conjunction with annexed drawing.

BRIEF DESCRIPTION OF THE DRAWING

FIG. 1 is a perspective view showing a lower unit repair fixture according to this invention, a lower unit of typical form being shown engaged therein in phantom lines;

FIG. 2 is an enlarged longitudinal cross section taken on line 2—2 of FIG. 1, looking in the direction of the arrows;

DESCRIPTION OF THE PREFERRED EMBODIMENT

Figure 4:
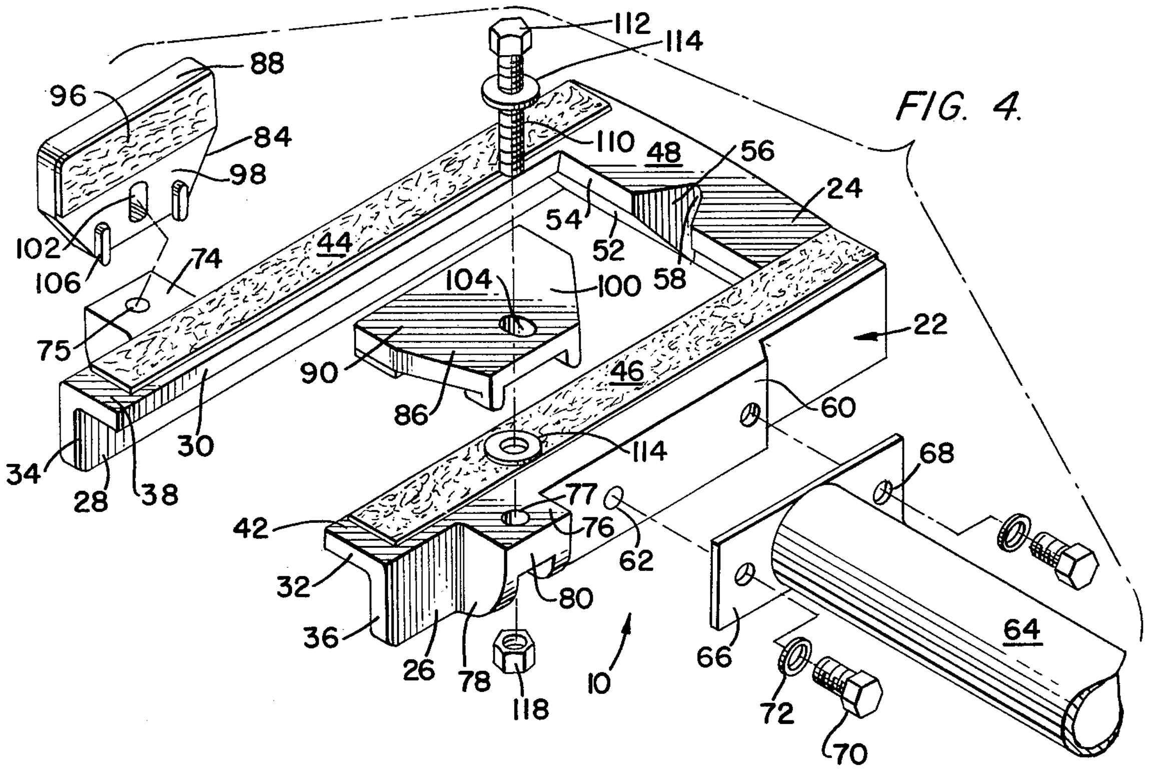
FIG. 4 is a disassembled perspective view of the unit.
Figure 3:
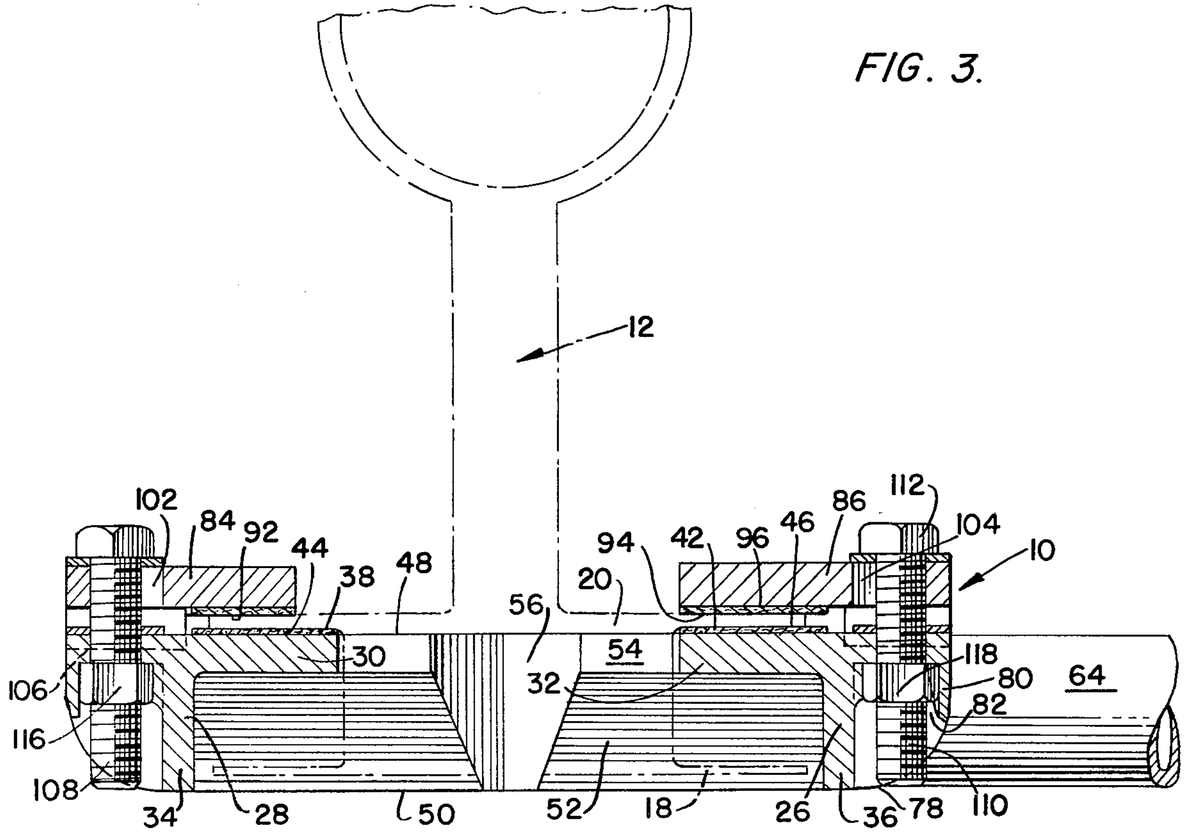
FIG. 3 is a transverse cross section taken on line 3—3 of FIG. 2, looking in the direction of the arrows.

Referring to the drawings in more detail, a lower unit holding fixture according to this invention is therein shown and identified generally by reference numeral 10. The unit is for engaging a lower unit 12 of an outboard motor or outdrive which comprises a housing 14 with a pointed leading end 16. These housings have horizontal cavitation plates or flanges including an upper flange 18 and a lower flange 20 which, in many current engine designs, are closely spaced relative to one another.

The fixture 10 is adapted to clampingly engage the lower unit during servicing and repair operations. Fixture 10 includes a main body section 22 formed integrally as by casting. The body section 22 is of U-form and includes a bight portion 24, and proximal and distal side arms 26, 28, respectively projecting from the opposite ends of the bight portion. Each of the side arms is of inverted L-shape, and the arms have top plates 30 and 32, and side plates 34, 36. The top plates have top surfaces 38 and 42, and a protective pad 44, 46 is adhesively secured along the major portion of each.

The bight portion 24 has a top surface 48, co-planar with the surfaces 38 and 42, a bottom surface 50 and a slant inside wall 52 extending from the bottom to a front wall 54. A substantially V-form notch is formed in the bight portion centrally thereof, and opens inwardly on the slant wall 52 and front wall 54. The notch has a rearwardly sloping, rounded apex 58, and is shaped to receive and to engage the aforesaid leading end 16 of the lower unit in the fashion suggested in FIG. 1.

The side plate 36 of the proximal side arm 26 has an enlarged substantially rectangular boss member 60 thereon. The boss member has a plurality of threaded openings 62 tapped therein. An elongated tubular supporting projection 64 has a mounting plate 68 secured, as by welding, to one end thereof. The plate 66 has holes 68 aligned with the openings 62, and screws 70 with washers 72 are employed to lock the plate 66 flush against the boss member 60. The body section thus is employed with, for example, a sleeve mount (not shown, but identical to that disclosed in Pat. No. 3,316,205) into the sleeve of which the supporting projecton 64 is telescopically received. Thus, the body section, and the workpiece mounted thereon may be adjusted both rotationally and longitudinally as to position.

Integrally formed on each of the side plates 34 and 36 of the side arms are outwardly extending bracket ledges 74 and 76. The tops of these ledges are co-planar with the top surfaces 38 and 42 of the arms, and the ledges extend outwardly. The ledges have vertical openings 75 and 77 formed therein. Depending from the ledges and secured also to the side plates are pairs of depending, spaced apart legs 78. The ledges each also have a depending lip 80 which is connected also to the legs, whereby a substantially rectangular chamber 82 is formed beneath each ledge, for a purpose appearing below.

Clamp plates 84 and 86 are provided, and have elongated inner sections 88 and 90 with flat lower surfaces 92, 94. Pads, formed of cord strips 96 or the like are adhesively bonded thereto. Outboard of the elongated section, the plates each have outer sections 98 and 100 with transversely elongated slots 102, 104 formed therein. Extending from the lower surfaces of these sections are pairs of laterally spaced lugs 106. The spacing between the lugs is such that the lugs ride on either side of the ledges 74 and 76 to serve as guides for the clamping plates. The slots 102 and 104 are aigned over the openings 75 and 77, and elongated bolts 108, 110 extended therethrough, the bolts having bolt heads 112 and having suitable washers 114. Nuts 116, 118 are threadedly engaged on the bolt and upon preliminary tightening are engaged in the chambers 82. Continued torque applied to the heads 112 thus tightens or loosens this connection. When the lower cavitation flange 20 of the lower unit is placed between the top plates of the side arms and the clamp plates, the motor or lower unit is then effectively held in selected position. By virtue of this configuration, the unit may be clamped even where the space between the upper and lower cavitation plates is very small. Also, the slot and guide lug features permit close adjustment of positioning of the unit.

We claim:

1. In an outboard motor repair fixture for use in clamping the lower unit of an outboard motor, said lower unit including a housing with a pointed leading section and horizontal fin elements, the repair fixture including an elongated, tubular supporting projection engaged telescopically in a horizontal sleeve fixedly mounted on a work surface, the repair fixture comprising:

a substantially uniform main body section including a bight portion and proximal and distal side arms projecting from the ends of the bight portion;

each of the side arms being of L-shaped cross section and including a top plate and a side plate;

the bight portion having a top surface horizontally aligned with the top plates of the side arms, a bottom surface, and having a slant wall extending from the top surface to the bottom surface;

the bight portion having a centrally located substantially V-form notch formed therein opening on said top surface and having a rearwardly slooping rounded apex extending to the bottom surface, the V-notch receiving the pointed leading section of the lower unit;

the side plate of the proximal side arm having a boss member fixedly secured thereon and the tubular supporting projection being detachably secured to said boss member;

each of the side arms having outwardly extending bracket ledges with openings therein;

clamp plates engaged on said bracket ledges, the clamp plates having clamp surfaces extending over the top plates of the respective side arms, the clamp plates having slots therein over the openings of the bracket ledges;

the horizontal fin element of the outboard motor being engaged between the respective clamp surfaces and the top plates; and changeable fasteners extending through said aligned openings and slots to releasably lock the clamp plates over the fin element.

2. The invention of claim 1, wherein:

the top plates and the clamp surfaces have protective pads thereon.

3. The invention of claim 1, wherein:

the bracket ledges each have depending legs;

the changeable fasteners comprise bolts and nuts; and the nuts are mounted between the legs and engaged therebetween.

4. The invention of claim 1, wherein:

the clamp plates have depending lugs thereon;

the lugs are arranged in pairs with one lug of each pair on either side of each ledge.

* * * * *